United States Patent
Popoli

(10) Patent No.: US 8,238,813 B1
(45) Date of Patent: Aug. 7, 2012

(54) COMPUTATIONALLY EFFICIENT DESIGN FOR BROADCAST SATELLITE SINGLE WIRE AND/OR DIRECT DEMOD INTERFACE

(75) Inventor: Robert F. Popoli, Ranchos Palos Verdes, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 465 days.

(21) Appl. No.: 12/195,256

(22) Filed: Aug. 20, 2008

Related U.S. Application Data

(60) Provisional application No. 60/956,889, filed on Aug. 20, 2007.

(51) Int. Cl.
H04B 3/36 (2006.01)
(52) U.S. Cl. ......... 455/7; 455/11.1; 455/13.1; 455/13.3; 455/20; 455/21; 725/63; 725/68; 725/70; 725/78; 725/82
(58) Field of Classification Search .... 455/7, 11.1–13.3, 455/20, 21; 725/63, 68, 70, 78, 82, 85
See application file for complete search history.

(56) References Cited

U.S. PATENT DOCUMENTS

| | | |
|---|---|---|
| 3,581,209 A | 5/1971 | Zimmerman |
| 3,670,275 A | 6/1972 | Kalliomaki et al. |
| 4,064,460 A | 12/1977 | Gargini |
| 4,132,952 A | 1/1979 | Hongu et al. |
| 4,354,167 A | 10/1982 | Terreault et al. |
| 4,382,266 A | 5/1983 | Panzer |
| 4,397,037 A | 8/1983 | Theriault |
| 4,403,343 A | 9/1983 | Hamada |
| 4,509,198 A | 4/1985 | Nagatomi |
| 4,513,315 A | 4/1985 | Dekker et al. |
| 4,530,008 A | 7/1985 | McVoy |
| 4,532,543 A | 7/1985 | Groenewegen |
| 4,538,175 A | 8/1985 | Balbes et al. |
| 4,545,075 A | 10/1985 | Miller et al. |
| 4,556,988 A | 12/1985 | Yoshisato |
| 4,592,093 A | 5/1986 | Ouchi et al. |
| 4,608,710 A | 8/1986 | Sugiura |
| 4,628,506 A | 12/1986 | Sperlich |
| 4,656,486 A | 4/1987 | Turner |
| 4,663,513 A | 5/1987 | Webber |
| 4,667,243 A | 5/1987 | Blatter et al. |
| 4,672,687 A | 6/1987 | Horton et al. |

(Continued)

FOREIGN PATENT DOCUMENTS

CN 1413021 4/2003

(Continued)

OTHER PUBLICATIONS

Notice of Allowance dated Dec. 23, 2010 in U.S. Appl. No. 11/219,418, filed Sep. 2, 2005 by Thomas H. James et al.

(Continued)

Primary Examiner — Fayyaz Alam

(57) ABSTRACT

A broadcast satellite single wire interface. Such an interface comprises a low noise block amplifier module having multiple outputs, a plurality of filter banks, each filter bank coupled to each of the outputs of the low noise block amplifier module in a respective fashion and comprising a plurality of filters, and a plurality of analog-to-digital (A/D) converters, each A/D converter coupled to a filter in the plurality of filters in the plurality of filter banks in a respective fashion, wherein the A/D converters directly sample incoming downconverted broadcast satellite signals and the sampled incoming downconverted broadcast signals are output on a single wire in a stacked output.

16 Claims, 7 Drawing Sheets

U.S. PATENT DOCUMENTS

| | | | |
|---|---|---|---|
| 4,675,732 A | 6/1987 | Oleson | |
| 4,710,972 A | 12/1987 | Hayashi et al. | |
| 4,723,320 A | 2/1988 | Horton | |
| 4,761,825 A | 8/1988 | Ma | |
| 4,761,827 A | 8/1988 | Horton et al. | |
| 4,785,306 A | 11/1988 | Adams | |
| 4,802,239 A | 1/1989 | Ooto | |
| 4,805,014 A | 2/1989 | Sahara et al. | |
| 4,813,036 A | 3/1989 | Whitehead | |
| 4,823,135 A | 4/1989 | Hirashima et al. | |
| 4,860,021 A | 8/1989 | Kurosawa et al. | |
| 4,866,787 A | 9/1989 | Olesen | |
| 4,876,736 A | 10/1989 | Kiewit | |
| 4,885,803 A | 12/1989 | Hermann et al. | |
| 4,903,031 A | 2/1990 | Yamada | |
| 4,945,410 A | 7/1990 | Walling | |
| 5,010,400 A | 4/1991 | Oto | |
| 5,027,430 A | 6/1991 | Yamauchi et al. | |
| 5,068,918 A | 11/1991 | Verheijen et al. | |
| 5,073,930 A | 12/1991 | Green et al. | |
| 5,119,509 A | 6/1992 | Kang | |
| 5,235,619 A | 8/1993 | Beyers, II et al. | |
| 5,249,043 A | 9/1993 | Grandmougin | |
| 5,276,904 A | 1/1994 | Mutzig et al. | |
| 5,289,272 A | 2/1994 | Rabowsky et al. | |
| 5,301,352 A | 4/1994 | Nakagawa et al. | |
| 5,382,971 A | 1/1995 | Chanteau | |
| 5,437,051 A | 7/1995 | Oto | |
| 5,521,631 A | 5/1996 | Budow et al. | |
| 5,565,805 A | 10/1996 | Nakagawa et al. | |
| 5,572,517 A | 11/1996 | Safadi | |
| 5,574,964 A | 11/1996 | Hamlin | |
| 5,587,734 A | 12/1996 | Lauder et al. | |
| 5,617,107 A | 4/1997 | Fleming | |
| 5,649,318 A | 7/1997 | Lusignan | |
| 5,675,390 A | 10/1997 | Schindler et al. | |
| 5,708,961 A | 1/1998 | Hylton et al. | |
| 5,734,356 A | 3/1998 | Chang | |
| 5,748,732 A | 5/1998 | Le Berre et al. | |
| 5,760,819 A | 6/1998 | Sklar et al. | |
| 5,760,822 A | 6/1998 | Coutinho | |
| 5,787,335 A | 7/1998 | Novak | |
| 5,790,202 A | 8/1998 | Kummer et al. | |
| 5,793,413 A | 8/1998 | Hylton et al. | |
| 5,805,806 A | 9/1998 | McArthur | |
| 5,805,975 A | 9/1998 | Green et al. | |
| 5,835,128 A | 11/1998 | MacDonald et al. | |
| 5,838,740 A | 11/1998 | Kallman et al. | |
| 5,848,239 A | 12/1998 | Ando | |
| 5,864,747 A | 1/1999 | Clark et al. | |
| 5,883,677 A | 3/1999 | Hofmann | |
| 5,886,995 A | 3/1999 | Arsenault et al. | |
| 5,898,455 A | 4/1999 | Barakat et al. | |
| 5,905,941 A | 5/1999 | Chanteau | |
| 5,905,942 A | 5/1999 | Stoel et al. | |
| 5,923,288 A | 7/1999 | Pedlow, Jr. | |
| 5,936,660 A | 8/1999 | Gurantz | |
| 5,959,592 A | 9/1999 | Petruzzelli | |
| 5,970,386 A | 10/1999 | Williams | |
| 5,982,333 A | 11/1999 | Stillinger et al. | |
| 6,005,861 A | 12/1999 | Humpleman | |
| 6,011,597 A | 1/2000 | Kubo | |
| 6,023,603 A | 2/2000 | Matsubara | |
| 6,038,425 A | 3/2000 | Jeffrey | |
| 6,100,883 A | 8/2000 | Hoarty | |
| 6,104,908 A | 8/2000 | Schaffner et al. | |
| 6,134,419 A | 10/2000 | Williams | |
| 6,147,714 A | 11/2000 | Terasawa et al. | |
| 6,173,164 B1 | 1/2001 | Shah | |
| 6,188,372 B1 | 2/2001 | Jackson et al. | |
| 6,192,399 B1 | 2/2001 | Goodman | |
| 6,198,449 B1 | 3/2001 | Muhlhauser et al. | |
| 6,198,479 B1 | 3/2001 | Humpleman et al. | |
| 6,202,211 B1 | 3/2001 | Williams, Jr. | |
| 6,292,567 B1 | 9/2001 | Marland | |
| 6,304,618 B1 | 10/2001 | Hafeez et al. | |
| 6,340,956 B1 | 1/2002 | Bowen et al. | |
| 6,397,038 B1 | 5/2002 | Green, Sr. et al. | |
| 6,424,817 B1 | 7/2002 | Hadden | |
| 6,430,233 B1 | 8/2002 | Dillon et al. | |
| 6,430,742 B1 | 8/2002 | Chanteau | |
| 6,441,797 B1 | 8/2002 | Shah | |
| 6,442,148 B1 | 8/2002 | Adams et al. | |
| 6,452,991 B1 | 9/2002 | Zak | |
| 6,463,266 B1 | 10/2002 | Shohara | |
| 6,493,873 B1 | 12/2002 | Williams | |
| 6,493,874 B2 | 12/2002 | Humpleman | |
| 6,501,770 B2 | 12/2002 | Arsenault et al. | |
| 6,510,152 B1 | 1/2003 | Gerszberg et al. | |
| 6,549,582 B1 | 4/2003 | Friedman | |
| 6,574,235 B1 | 6/2003 | Arslan et al. | |
| 6,598,231 B1 | 7/2003 | Basawapatna et al. | |
| 6,600,897 B1 | 7/2003 | Watanabe et al. | |
| 6,653,981 B2 | 11/2003 | Wang et al. | |
| 6,728,513 B1 | 4/2004 | Nishina | |
| 6,762,727 B2 | 7/2004 | Rochford et al. | |
| 6,864,855 B1 | 3/2005 | Fujita | |
| 6,865,193 B2 | 3/2005 | Terk | |
| 6,879,301 B2 | 4/2005 | Kozlovski | |
| 6,889,385 B1 | 5/2005 | Rakib et al. | |
| 6,906,673 B1 | 6/2005 | Matz et al. | |
| 6,941,576 B2 | 9/2005 | Amit | |
| 6,944,878 B1 | 9/2005 | Wetzel et al. | |
| 7,010,265 B2 | 3/2006 | Coffin, III | |
| 7,016,643 B1 | 3/2006 | Kuether et al. | |
| 7,020,081 B1 | 3/2006 | Tani et al. | |
| 7,039,169 B2 | 5/2006 | Jones | |
| 7,069,574 B1 | 6/2006 | Adams et al. | |
| 7,085,529 B1 | 8/2006 | Arsenault et al. | |
| 7,130,576 B1 | 10/2006 | Gurantz et al. | |
| 7,239,285 B2 | 7/2007 | Cook | |
| 7,245,671 B1 | 7/2007 | Chen et al. | |
| 7,257,638 B2 | 8/2007 | Celik et al. | |
| 7,260,069 B2 | 8/2007 | Ram et al. | |
| 7,263,469 B2 | 8/2007 | Bajgrowicz et al. | |
| 7,519,680 B1 | 4/2009 | O'Neil | |
| 7,522,875 B1 | 4/2009 | Gurantz et al. | |
| 7,542,715 B1 * | 6/2009 | Gurantz et al. | 455/3.01 |
| 7,546,619 B2 | 6/2009 | Anderson et al. | |
| 7,603,022 B2 | 10/2009 | Putterman et al. | |
| 7,634,250 B1 * | 12/2009 | Prasad et al. | 455/403 |
| 2001/0055319 A1 | 12/2001 | Quigley et al. | |
| 2002/0044614 A1 | 4/2002 | Molnar | |
| 2002/0140617 A1 | 10/2002 | Luly et al. | |
| 2002/0152467 A1 | 10/2002 | Fiallos | |
| 2002/0154055 A1 | 10/2002 | Davis et al. | |
| 2002/0154620 A1 | 10/2002 | Azenkot et al. | |
| 2002/0178454 A1 | 11/2002 | Antoine et al. | |
| 2002/0181604 A1 | 12/2002 | Chen | |
| 2003/0023978 A1 | 1/2003 | Bajgrowicz | |
| 2003/0129960 A1 | 7/2003 | Kato | |
| 2003/0185174 A1 | 10/2003 | Currivan | |
| 2003/0217362 A1 | 11/2003 | Summers et al. | |
| 2003/0220072 A1 | 11/2003 | Coffin, III | |
| 2004/0060065 A1 | 3/2004 | James et al. | |
| 2004/0064689 A1 | 4/2004 | Carr | |
| 2004/0107436 A1 | 6/2004 | Ishizaki | |
| 2004/0136455 A1 | 7/2004 | Akhter et al. | |
| 2004/0153942 A1 | 8/2004 | Shtutman et al. | |
| 2004/0161031 A1 | 8/2004 | Kwentus et al. | |
| 2004/0163125 A1 | 8/2004 | Phillips et al. | |
| 2004/0184521 A1 | 9/2004 | Chen et al. | |
| 2004/0192190 A1 | 9/2004 | Motoyama | |
| 2004/0198237 A1 | 10/2004 | Abutaleb et al. | |
| 2004/0203425 A1 | 10/2004 | Coffin | |
| 2004/0214537 A1 | 10/2004 | Bargroff et al. | |
| 2004/0229583 A1 | 11/2004 | Ogino | |
| 2004/0244044 A1 | 12/2004 | Brommer | |
| 2004/0244059 A1 | 12/2004 | Coman | |
| 2004/0255229 A1 | 12/2004 | Shen et al. | |
| 2004/0261110 A1 | 12/2004 | Kolbeck et al. | |
| 2005/0002640 A1 | 1/2005 | Putterman et al. | |
| 2005/0033846 A1 | 2/2005 | Sankaranarayan et al. | |
| 2005/0052335 A1 | 3/2005 | Chen | |
| 2005/0054315 A1 | 3/2005 | Bajgrowicz et al. | |
| 2005/0057428 A1 | 3/2005 | Fujita | |
| 2005/0060525 A1 | 3/2005 | Schwartz, Jr. et al. | |

| | | | |
|---|---|---|---|
| 2005/0066367 A1 | 3/2005 | Fyke et al. | |
| 2005/0071882 A1 | 3/2005 | Rodriguez et al. | |
| 2005/0118984 A1 | 6/2005 | Akiyama et al. | |
| 2005/0138663 A1 | 6/2005 | Throckmorton et al. | |
| 2005/0184923 A1 | 8/2005 | Saito et al. | |
| 2005/0190777 A1 | 9/2005 | Hess et al. | |
| 2005/0193419 A1 | 9/2005 | Lindstrom et al. | |
| 2005/0198673 A1 | 9/2005 | Kit | |
| 2005/0204388 A1 | 9/2005 | Knudson et al. | |
| 2005/0240969 A1 | 10/2005 | Sasaki et al. | |
| 2005/0264395 A1 | 12/2005 | Bassi | |
| 2005/0289605 A1 | 12/2005 | Jeon | |
| 2006/0018345 A1 | 1/2006 | Nadarajah et al. | |
| 2006/0030259 A1 | 2/2006 | Hetzel et al. | |
| 2006/0041912 A1 | 2/2006 | Kuhns | |
| 2006/0048202 A1 | 3/2006 | Bontempi et al. | |
| 2006/0080707 A1 | 4/2006 | Laksono | |
| 2006/0112407 A1 | 5/2006 | Kakiuchi | |
| 2006/0133612 A1 | 6/2006 | Abedi et al. | |
| 2006/0174282 A1 | 8/2006 | Dennison et al. | |
| 2006/0225104 A1 | 10/2006 | James et al. | |
| 2006/0259929 A1 | 11/2006 | James et al. | |
| 2006/0294512 A1 | 12/2006 | Seiden | |
| 2007/0083898 A1 | 4/2007 | Norin et al. | |
| 2007/0202800 A1 | 8/2007 | Roberts et al. | |
| 2008/0064355 A1 | 3/2008 | Sutskover et al. | |
| 2008/0127277 A1 | 5/2008 | Kuschak | |
| 2008/0134279 A1 | 6/2008 | Curtis et al. | |
| 2008/0205514 A1 | 8/2008 | Nishio et al. | |
| 2009/0013358 A1 | 1/2009 | Throckmorton et al. | |
| 2009/0150937 A1 | 6/2009 | Ellis et al. | |
| 2009/0222875 A1 | 9/2009 | Cheng et al. | |
| 2009/0252316 A1* | 10/2009 | Ratmanski et al. | 379/202.01 |

FOREIGN PATENT DOCUMENTS

| | | |
|---|---|---|
| DE | 10114082 A1 | 1/2003 |
| EP | 1447987 A1 | 8/2004 |
| GB | 2354650 | 3/2001 |
| GB | 2377111 | 12/2002 |
| JP | 11355076 A | 12/1999 |
| WO | 02082351 A1 | 10/2002 |

OTHER PUBLICATIONS

Notice of Allowance dated Jan. 20, 2011 in U.S. Appl. No. 10/255,344, filed Sep. 25, 2002 by Thomas H. James et al.
Final Rejection dated Jan. 18, 2011 in U.S. Appl. No. 11/097,482, filed Apr. 1, 2005 by Thomas H. James et al.
Final Rejection dated Jan. 12, 2011 in U.S. Appl. No. 11/810,774, filed Jun. 7, 2007 by Hanno Basse et al.
Final Rejection dated Jan. 31, 2011 in U.S. Appl. No. 11/820,205, filed Jun. 18, 2007 by Hanno Basse et al.
Non-final Office action dated Jul. 20, 2010 in U.S. Appl. No. 11/810,774, filed Jun. 7, 2007 by Hanno Basse et al.
Non-final Office action dated Jun. 21, 2010 in U.S. Appl. No. 11/219,418, filed Sep. 2, 2005 by Thomas H. James et al.
Non-final Office action dated Jul. 20, 2010 in U.S. Appl. No. 10/255,344, filed Sep. 25, 2002 by Thomas H. James et al.
Non-final Office action dated Jul. 20, 2010 in U.S. Appl. No. 11/097,482, filed Apr. 1, 2005 by Thomas H. James et al.
Final Rejection dated Jul. 21, 2010 in U.S. Appl. No. 11/219,407, filed Sep. 2, 2005 by Thomas H. James et al.
Mexican Office action dated Jul. 26, 2010 in Mexican Patent Application No. MX/a/2008/015659 filed Jun. 18, 2007 by Hanno Basse et al.
Non-final Office action dated Aug. 13, 2010 in U.S. Appl. No. 11/820,205, filed Jun. 18, 2007 by Hanno Basse et al.
Non-final Office action dated Jun. 23, 2010 in U.S. Appl. No. 11/820,446, filed Jun. 19, 2007 by Thomas H. James et al.
Chinese Office action dated Jun. 23, 2010 in Chinese Patent Application No. 200780029062.3 filed Jun. 7, 2007 by Hanno Basse et al.
Supplementary European search report dated Jul. 6, 2010 in European Patent Application No. 06749159.7 filed Apr. 3, 2006 by Thomas H. James et al.
EPO Communication dated Jun. 25, 2010 in European Patent Application No. 07815055.4 filed Jun. 7, 2007 by Hanno Basse et al.
Non-final Office action dated Aug. 4, 2010 in U.S. Appl. No. 11/097,480, filed Apr. 1, 2005 by Thomas H. James et al.
Final Rejection dated Jul. 7, 2010 in U.S. Appl. No. 11/097,479, filed Apr. 1, 2005 by Thomas H. James et al.
Final Rejection dated Jun. 21, 2010 in U.S. Appl. No. 11/219,247, filed Sep. 2, 2005 by Thomas H. James et al.
Notice of Allowance dated Aug. 16, 2010 in U.S. Appl. No. 11/097,723, filed Apr. 1, 2005 by Thomas H. James et al.
Final Rejection dated Mar. 29, 2010 in U.S. Appl. No. 11/097,480, filed Apr. 1, 2005 by Thomas H. James et al.
Final Rejection dated Mar. 29, 2010 in U.S. Appl. No. 11/097,615, filed Apr. 1, 2005 by Thomas H. James et al.
Final Rejection dated Apr. 8, 2010 in U.S. Appl. No. 11/810,774, filed Jun. 7, 2007 by Hanno Basse et al.
Final Rejection dated Apr. 1, 2010 in U.S. Appl. No. 11/097,625, filed Apr. 1, 2005 by Thomas H. James et al.
International Search Report and Written Opinion dated Apr. 23, 2010 in International Application No. PCT/US2010/020246 filed Jun. 1, 2010 by Robert F. Popoli.
Final Rejection dated Apr. 26, 2010 in U.S. Appl. No. 11/820,205, filed Jun. 18, 2007 by Hanno Basse et al.
Non-final Office action dated Aug. 31, 2010 in U.S. Appl. No. 11/097,615, filed Apr. 1, 2005 by Thomas H. James et al.
EPO Communication dated Aug. 19, 2010 in European Patent Application No. 06749155.5 filed Apr. 3, 2006 by Thomas H. James et al.
Stmicroelectronics; "Extension of the DiseqC 1 Standard for Control of Satellite Channel Router Based One-Cable LNBs"; Application Note; Oct. 5, 2004; pp. 1-12; XP002399973.
Notice of Allowance dated Sep. 16, 2010 in U.S. Appl. No. 11/097,625, filed Apr. 1, 2005 by Thomas H. James et al.
Chinese Office action dated Nov. 18, 2010 in Chinese Patent Application No. 200880017830.8 filed May 28, 2008 by John L. Norin.
Translated Mexican Office action dated Oct. 12, 2010 in Mexican Patent Application No. MX/a/2008/015659 filed Jun. 18, 2007 by Hanno Basse et al.
Notice of Allowance dated Feb. 2, 2011 in U.S. Appl. No. 11/097,480, filed Apr. 1, 2005 by Thomas H. James et al.
Notice of Allowance dated Feb. 17, 2011 in U.S. Appl. No. 11/097,615, filed Apr. 1, 2005 by Thomas H. James et al.
Notice of Allowance dated Jan. 10, 2011 in U.S. Appl. No. 11/097,479, filed Apr. 1, 2005 by Thomas H. James et al.
EPO Supplementary search report dated Aug. 19, 2010 in European Patent Application No. 06740394.9 filed Apr. 3, 2006 by Thomas H. James et al.
EPO Supplementary search report dated Aug. 16, 2010 in European Patent Application No. 06749160.5 filed Apr. 3, 2006 by Thomas H. James et al.
EPO Supplementary search report dated Aug. 19, 2010 in European Patent Application No. 06749155.5 filed Apr. 3, 2006 by Thomas H. James et al.
Non-final Office action dated Mar. 15, 2011 in U.S. Appl. No. 11/820,446, filed Jun. 19, 2007 by Thomas H. James et al.
EPO Communication dated May 31, 2011 in European Patent Application No. 06802486.8 filed Aug. 30, 2006 by Thomas H. James et al.
Non-final Office action dated Dec. 16, 2011 in U.S. Appl. No. 12/127,718, filed May 27, 2008 by John L. Norin.
Non-final Office action dated Dec. 19, 2011 in U.S. Appl. No. 11/820,446, filed Jun. 19, 2007 by Thomas H. James et al.
European Telecommunications Satellite Organization (EUTELSAT); Digital Satellite Equipment Control (DiSEqC): Application Information for Tuner-Receivers/IRDs; Apr. 12, 1996; pp. 1-25.
Final Rejection dated Jan. 18, 2012 in U.S. Appl. No. 11/810,774, filed Jun. 7, 2007 by Hanno Basse et al.
Non-final Office action dated Feb. 22, 2012 in U.S. Appl. No. 11/219,407, filed Sep. 2, 2005 by Thomas H. James et al.
Non-final Office action dated Oct. 12, 2011 in U.S. Appl. No. 11/219,407, filed Sep. 2, 2005 by Thomas H. James et al.
Final Rejection dated May 14, 2012 in U.S. Appl. No. 11/820,446, filed Jun. 19, 2007 by Thomas H. James et al.

EPO communication dated May 3, 2012 in European Patent Application No. 06749157.1 filed Apr. 3, 2006 by Thomas H. James et al.
EPO Notice of intent to grant dated Apr. 26, 2012 in European Patent Application No. 06749158.9 filed Apr. 3, 2006 by Thomas H. James et al.
EPO Notice of intent to grant dated Apr. 26, 2012 in European Patent Application No. 06749162.1 filed Apr. 3, 2006 by Thomas H. James et al.

Non-final Office action dated Jun. 20, 2012 in U.S. Appl. No. 13/093,642, filed Apr. 25, 2011 by Thomas H. James et al.
Non-final Office action dated Jun. 19, 2012 in U.S. Appl. No. 11/219,247, filed Sep. 2, 2005 by Thomas H. James et al.
Final Rejection dated Jun. 11, 2012 in U.S. Appl. No. 11/219,407, filed Sep. 2, 2005 by Thomas H. James et al.

* cited by examiner

COMPUTATIONALLY EFFICIENT DESIGN FOR BROADCAST SATELLITE SINGLE WIRE AND/OR DIRECT DEMOD INTERFACE

CROSS-REFERENCE TO RELATED APPLICATIONS

This application claims the benefit under 35 U.S.C. §119 (e) of U.S. Provisional Application Ser. No. 60/956,889, filed on Aug. 20, 2007, by Robert Popoli, entitled "COMPUTATIONALLY EFFICIENT DESIGN FOR BROADCAST SATELLITE SINGLE WIRE AND/OR DIRECT DEMOD INTERFACE,"
which application is incorporated by reference herein.

BACKGROUND OF THE INVENTION

1. Field of the Invention

The present invention relates generally to satellite video systems, and in particular, to a method, apparatus, and article of manufacture for efficiently delivering satellite broadcast signals.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

FIG. 1 illustrates a typical satellite-based broadcast system of the related art.

System 100 uses signals sent from Satellite A (SatA) 102, Satellite B (SatB) 104, and Satellite C (SatC) 106 that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to monitor 114 for viewing by a user. There can be more than one satellite transmitting from each orbital location (slot). The orbital slots are typically designated by their longitude, so, for example, a satellite 102 located in the orbital slot at 101 degrees West Longitude (WL) is usually referred to as transmitting from "101."

Satellite uplink signals 116 are transmitted by one or more uplink facilities 118 to the satellites 102-104 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Each satellite 102-106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz, but can also be broadcast in the Ka-band of frequencies, i.e., 18-40 GHz, but typically 20-30 GHz.

As satellites 102-106 broadcast additional services and additional channels to viewers, it will be necessary to deliver these services in a more efficient manner.

SUMMARY OF THE INVENTION

To minimize the limitations in the prior art, and to minimize other limitations that will become apparent upon reading and understanding the present specification, the present invention discloses a computationally efficient design for broadcast satellite single wire and/or direct demod interface.

A broadcast satellite single wire interface in accordance with the present invention comprises a low noise block amplifier module having multiple outputs, a plurality of filter banks, each filter bank coupled to each of the outputs of the low noise block amplifier module in a respective fashion and comprising a plurality of filters, and a plurality of analog-to-digital (A/D) converters, each A/D converter coupled to a filter in the plurality of filters in the plurality of filter banks in a respective fashion, wherein the A/D converters directly sample incoming downconverted broadcast satellite signals and the sampled incoming downconverted broadcast signals are output on a single wire in a stacked output.

Such an interface further optionally comprises the sampling frequency of the A/D converters being adjustable, a digital signal processor (DSP), the DSP comprising a plurality of polyphase bandpass filters, the plurality of polyphase bandpass filters overlapping in terms of passbands, a plurality of stacked outputs being present, at least one of the plurality of stacked outputs being an In-phase/Quadrature phase (I/Q) near-baseband output, and the I/Q near-baseband output being networked onto a distribution layer.

Other features and advantages are inherent in the system disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION

Figure 1:
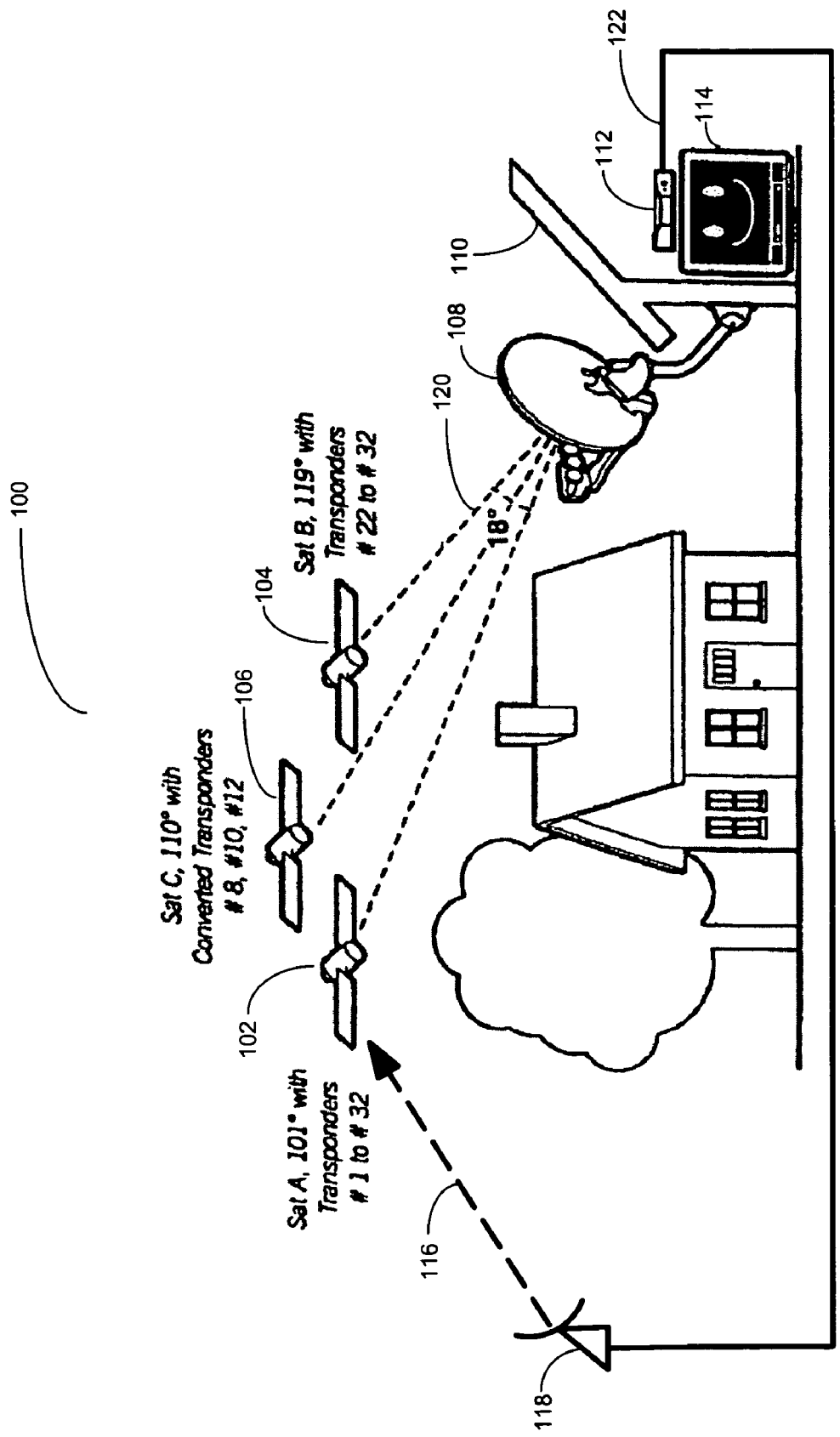
FIG. 1 illustrates a typical satellite-based broadcast system of the related art.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Recent advances in high speed Analog to Digital (A/D) converters open up the possibility of direct A/D conversion of baseband or near baseband 500 MHz wide Satellite downlink signals and thereby opens up the possibility of all digital demultiplexing (demuxing) of one or more 500 MHz complexes or transponders and subsequent all digital multiplexing (muxing) of a selected subset of these transponder channels onto a single wire interface for home distribution. The possibility of all digital demuxing and feeding of selected transponder baseband I/Q signals for direct demod for subsequent home or multi-dwelling distribution over any suitable physical/network layer protocols now also becomes possible.

To capitalize on these opportunities of an all-digital demuxing/muxing and baseband I/Q interfaces, computationally efficient Digital Signal Processing (DSP) architectures are required. It is assumed that simple brute force digital mimicry of the analog building blocks of demuxing/muxing/conversion processes will not lead to commercially viable designs. By bringing together the high-speed A/D hardware and computationally efficient DSP techniques, and adapting them specifically for the purposes of demuxing, muxing, and baseband I/Q conversion, the present invention provides one or more preferred embodiments with significant commercial advantages over other current designs.

No known previously proposed satellite home/MDU distribution design exists to create a practical all digital implementation of the demuxing, muxing, and direct digital demodulation (demod) interface. This invention proposes a number of embodiments of such designs which utilize computationally efficient techniques which allow for commercially viable all digital implementation of these functions.

The present invention allows for better overall performance of an embodiment of a Single Wire Multiswitch (SWM) architecture because the present invention allows for the distribution of more channels within the same bandwidth (i.e., single wire bandwidth) through tighter packing of channels. Distribution of additional channels allows for the support of additional IRDs, or the same number of IRDs with less wired bandwidth. Further, embodiments of the present invention allow for inexpensive provision of baseband I/Q signals for reduced cost integration of a significant portion of the current IRD. Further still, embodiments of the present invention allow for the ability to provide greater flexibility for future system designs, and the potential of a smaller footprint for the SWM into the current system. Embodiments of the present invention also allow for simpler integration and interfaces between the parts of the present system, by simplifying the interface of shared demod resources without expending any bandwidth. This simplification allows for future products, such as Home Gateway and Multi-Dwelling Unit (MDU) architectures, to become possible.

Digital SWM

Figure 2:
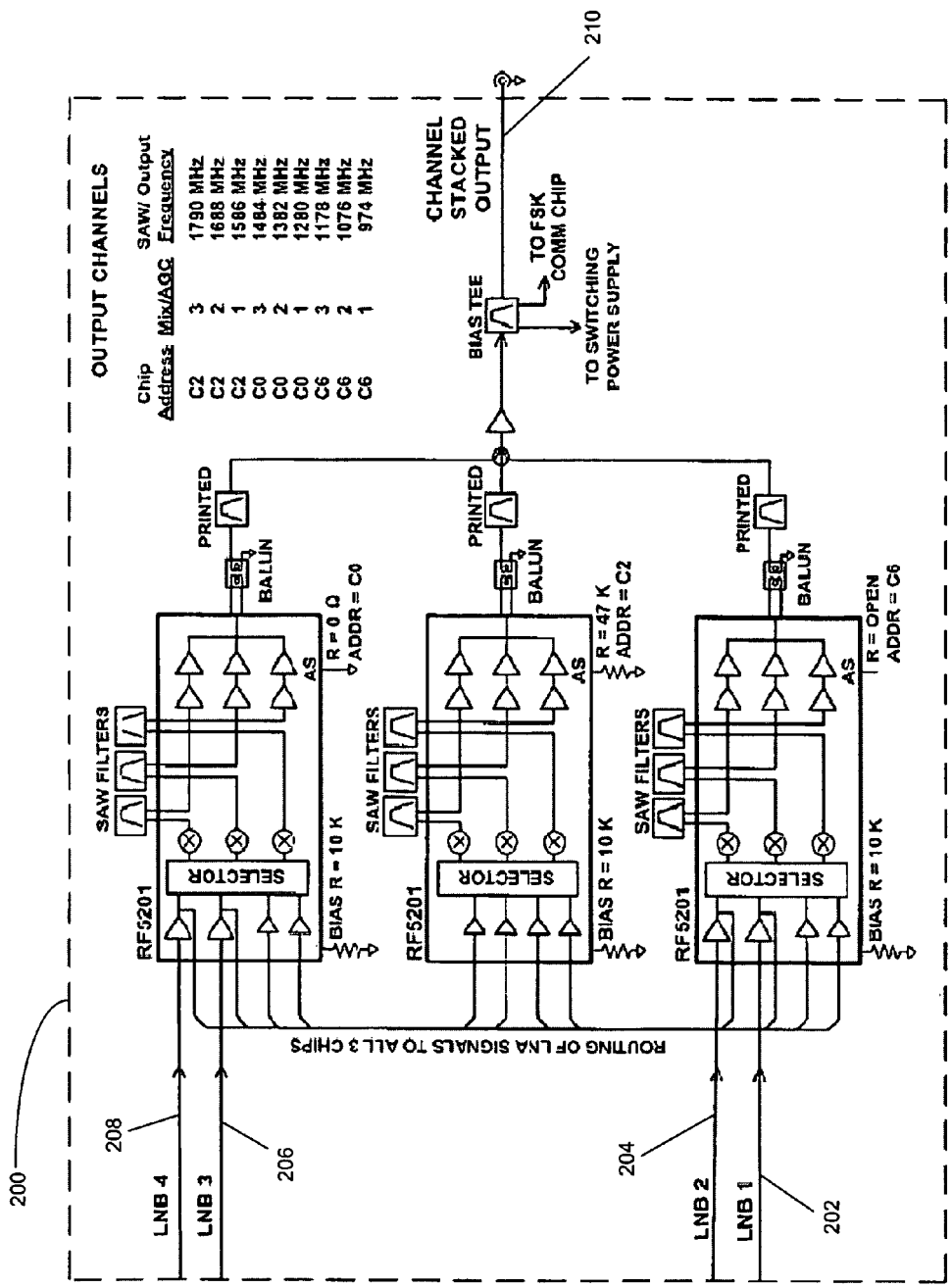
FIG. 2 illustrates a typical Single Wire Multiswitch of the related art.

FIG. 2 illustrates a typical Single Wire Multiswitch.

Hardware advances have increased A/D sampling rates in excess of 1 Gigasample/second (1 Gsps) with a good Effective Number Of Bits (ENOB) and an adequate linearity performance figure. Advances in Multi-rate Digital Signal Processing techniques coupled with nanometer Application-Specific Integrated Circuit (ASIC) processes allow applications with significant signal processing capabilities. These factors make it possible to make an all-digital replacement for the demux and mux functions of the Single Wire Multiswitch (SWM). Further, these technological advances allow for a baseband and/or near baseband digital I/Q interface for cost-effective integration of a significant portion of the IRD front end functionality.

The present invention provides embodiments for a digital replacement for the hardware shown in FIG. 2. FIG. 2 illustrates SWM 200, where SWM 200 is fed by four composite signals 202-208, specifically LNB1 202, LNB2 204, LNB3 206, and LNB4 208, which are produced by the LNB module 300 hardware shown in FIG. 3A.

Figures 3A, 3B:
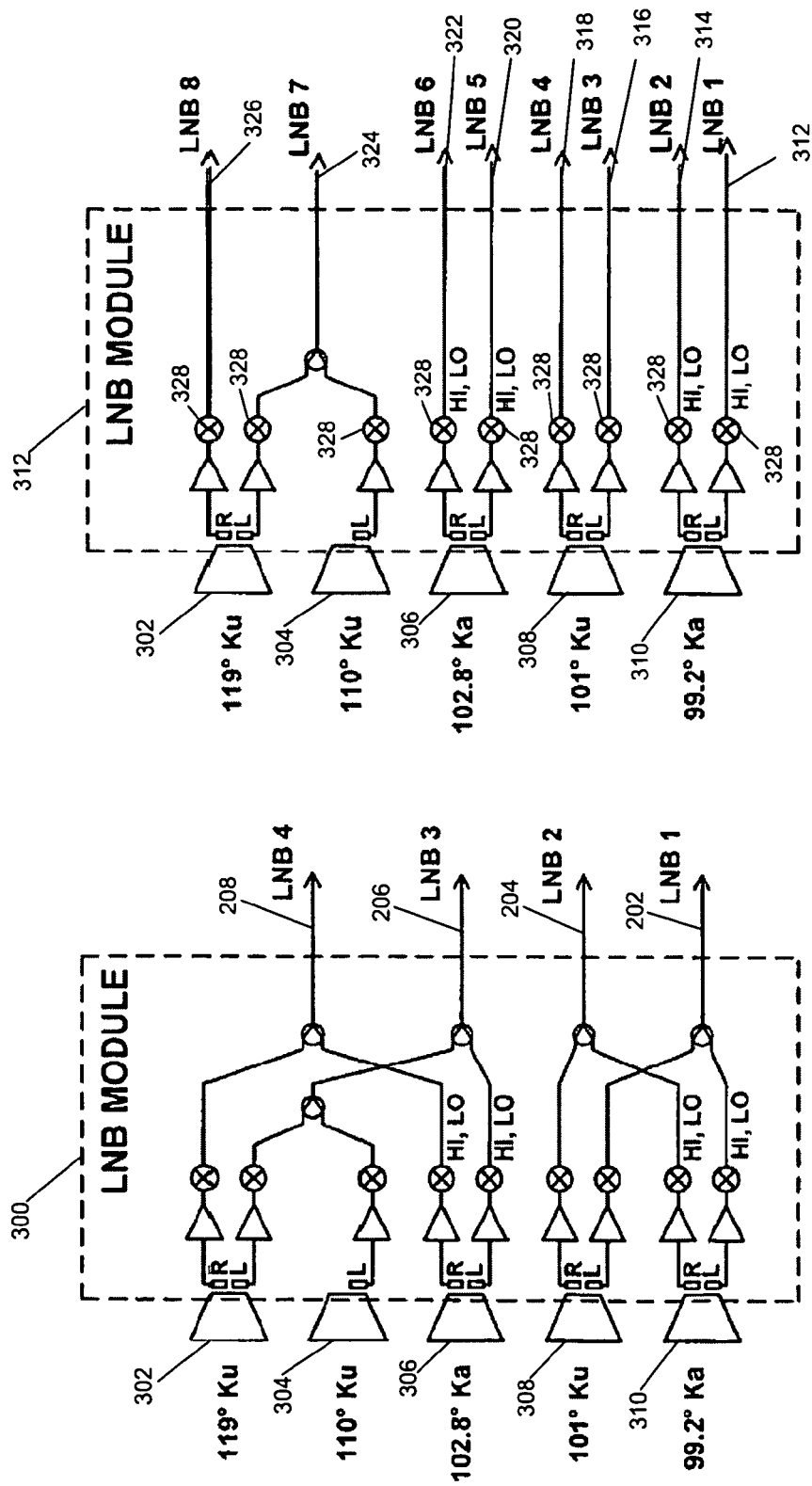
FIGS. 3A and 3B illustrate related LNB modules and an LNB module in accordance with one or more embodiments of the present invention, respectively.

Each LNB signal 202-208, as shown in FIG. 3A, comprises 3 stacked 500 MHz bandwidth signals, generated from downlink signals 120 and received at various orbital slots. Ku-band signals 302 are from satellites at the 119 WL slot, Ku-band signals 304 are from satellites at the 110 WL slot, Ka-band signals 306 are from satellites at the 102.8 (also referred to as 103) WL slot, Ku-band signals 308 are from satellites at the 101 WL slot, and Ka-band signals 302 are from satellites at the 99.2 (also referred to as 99) WL slot. Combinations of these signals, based on their polarization and transmission frequencies, are used to generate LNB signals 202-208.

After down conversion within module 300, the Ku-band signals 302, 304, and 308 are downconverted to an Intermediate Frequency (IF) band, 500 MHz wide, in the frequency range of 950-1450 MHz. The Ka-band signals 306 and 310 are downconverted into two different 500 MHz wide bandwidths, namely the 250-750 MHz bandwidth (known as Ka-LO IF band or Ka-B IF band) and the 1650-2150 MHz bandwidth (known as Ka-HI IF band or Ka-A IF band), and are combined in various combinations to form signals 202-208

The SWM 200 shown in FIG. 2 selects any nine 40 MHz pieces of spectrum from LNB1 202 through LNB4 208 and stacks them to form a single composite signal called the channel stacked output 210. The nine 40 MHz channels are typically located on 102 MHz centers and range from 974 MHz to 1790 MHz (i.e., the channels are at 974, 1076, 1178, 1280, 1382, 1484, 1586, 1688, and 1790 MHz, respectively).

Coarse Granularity Design

FIG. 3B illustrates an embodiment of a corresponding Coarse Granularity Design Digital SWM in accordance with the present invention.

The SWM module 300 is modified into module 312, where signals 302-310 are combined into different signals that are to be used as inputs to a modified SWM. Rather than stacking 1500 MHz into a single signal, as is done with signals 202-208, a larger number of outputs 312-326 are used. Although eight outputs 312-326 are shown, a larger or smaller number of outputs 312-326 are possible without departing from the scope of the present invention.

As shown in FIG. 3B, LNB1 signal 312, LNB2 signal 314, LNB5 signal 320, and LNB6 signal 322 each comprise two 500 MHz signals, each 500 MHz signal corresponding to a Ka-LO band signal and a Ka-HI band signal. LNB3 signal 316, LNB4 signal 318, LNB7 signal 324, and LNB8 signal 326, on the other hand, are 500 MHz signals, each corresponding to a Ku-band signal. To facilitate A/D conversion, the local oscillators 328 can be modified so that each of the signals 312-326 can have a desired and, possibly, different tunable starting frequency from 10 to 100 MHz, or beyond these limits if desired. Additional mixing can be added to achieve an offset frequency start for one or more of the signals 312-326 if desired. It is also possible within the scope of the present invention to implement tuning for signals 312-326 within the digital domain if desired.

Figure 4:
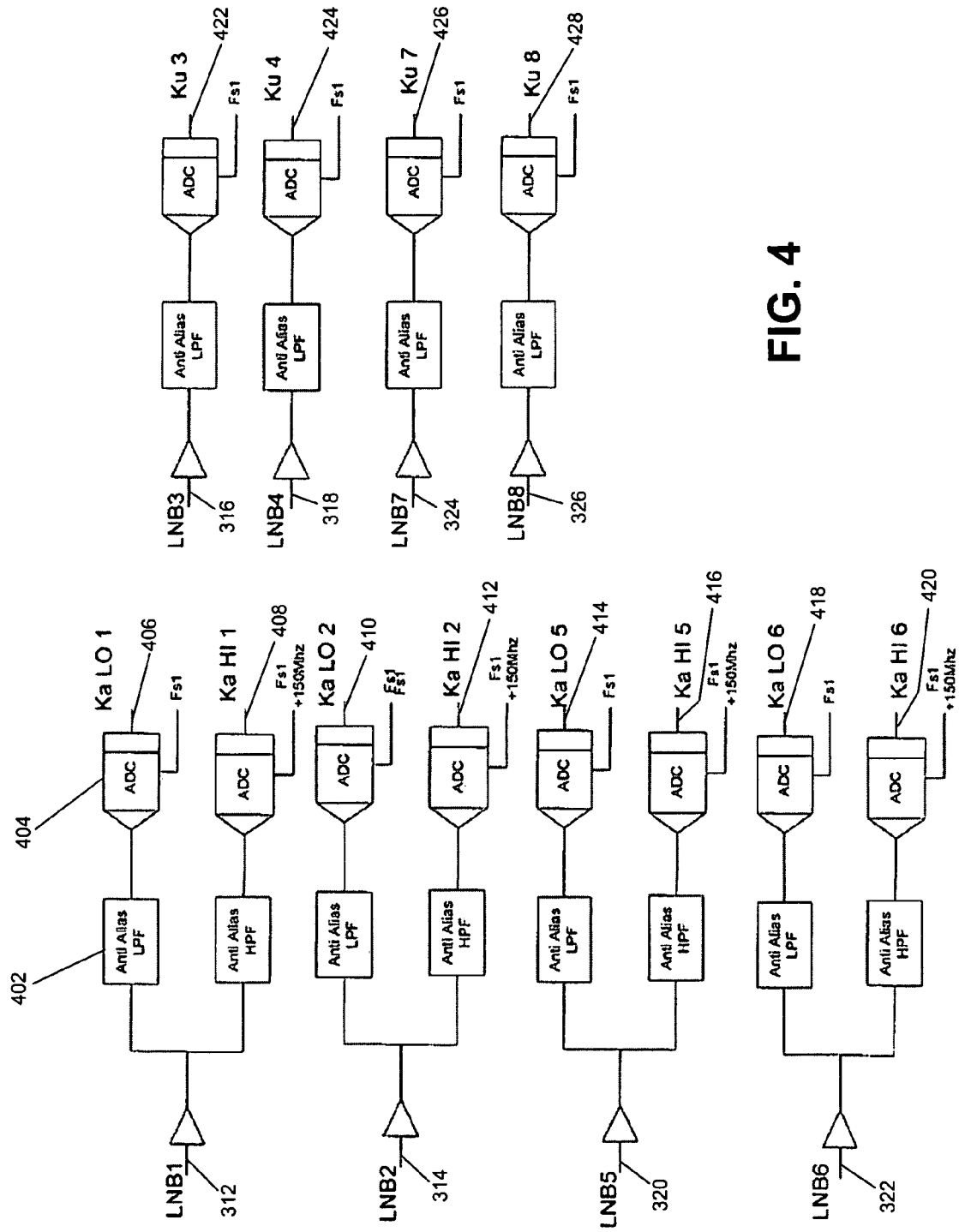
FIG. 4 illustrates an Analog-to-Digital subsystem functionality in accordance with one or more embodiments of the present invention.

FIG. 4 illustrates an embodiment of the Analog-to-Digital subsystem functionality of the present invention.

FIG. 4 shows the A/D subsystem 400 functions, where the sampling frequency Fs is adjustable, typically from 1.02 GHz to 1.2 GHz, but other frequencies and ranges are possible within the scope of the present invention. Each signal 312-326 is placed through a filter 402, and then into an A/D converter 404, which produce the output signals 406-428. The typical maximal sampling rate of the A/D converters 404, FsMAX, is typically 1.35 GHz, but other rates are possible without departing from the scope of the present invention.

The Ka HI signals are typically sub-sampled, so the analog paths should have a useable bandwidth of FsMAX+500 MHz, which is typically 1.85 GHz.

Figure 5:
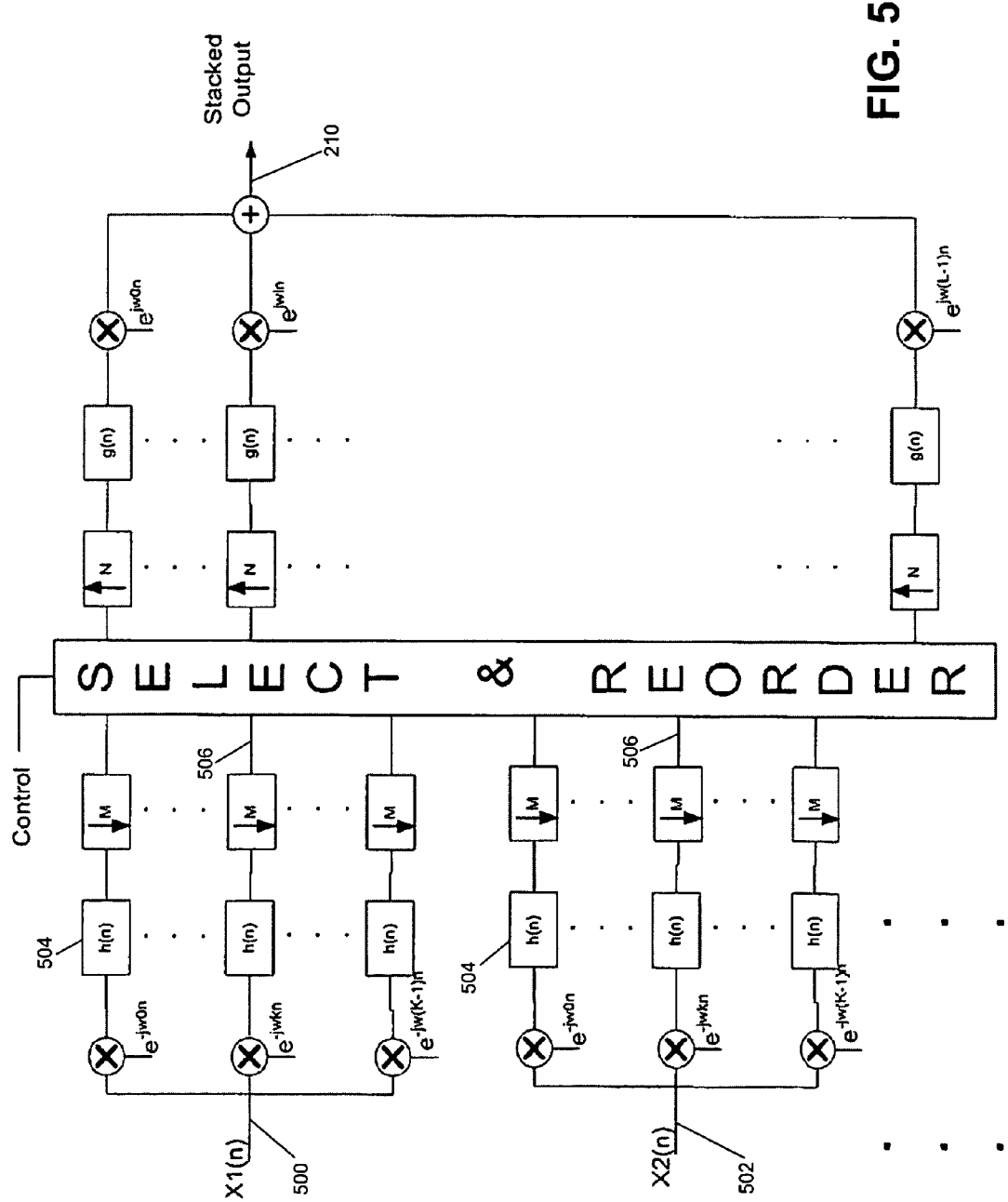
FIG. 5 illustrates a block diagram of the DSWM Channelizer in accordance with one or more embodiments of the present invention.

FIG. 5 illustrates a block diagram of the DSWM Channelizer in accordance with one or more embodiments of the present invention.

Each input "x" 500, 502, etc., receives one of the A/D converter 404 outputs 406-428, and there can be extra inputs x 500, 502, etc., to allow for expansion of the system. Each typical input x 500 is typically channelized into uniformly spaced K filters 504. The portion k 506 of the K filters 504 actually utilized will be different for different LNB paths, and, typically, k=3 for Ka HI, k=12 for Ka LO, and k=16 for Ku. L, the number of filter bands on the output side, is set to be equal to the number of stacked carriers desired at the stacked output 210.

There are many embodiments within the scope of the present invention that can create computationally efficient DSP architectures. Another example embodiment of the present invention uses multi-rate poly phase techniques and takes advantage of the correspondence between the complex mixing and the Fast Fourier Transform (FFT), as shown in FIG. 6.

Figure 6:
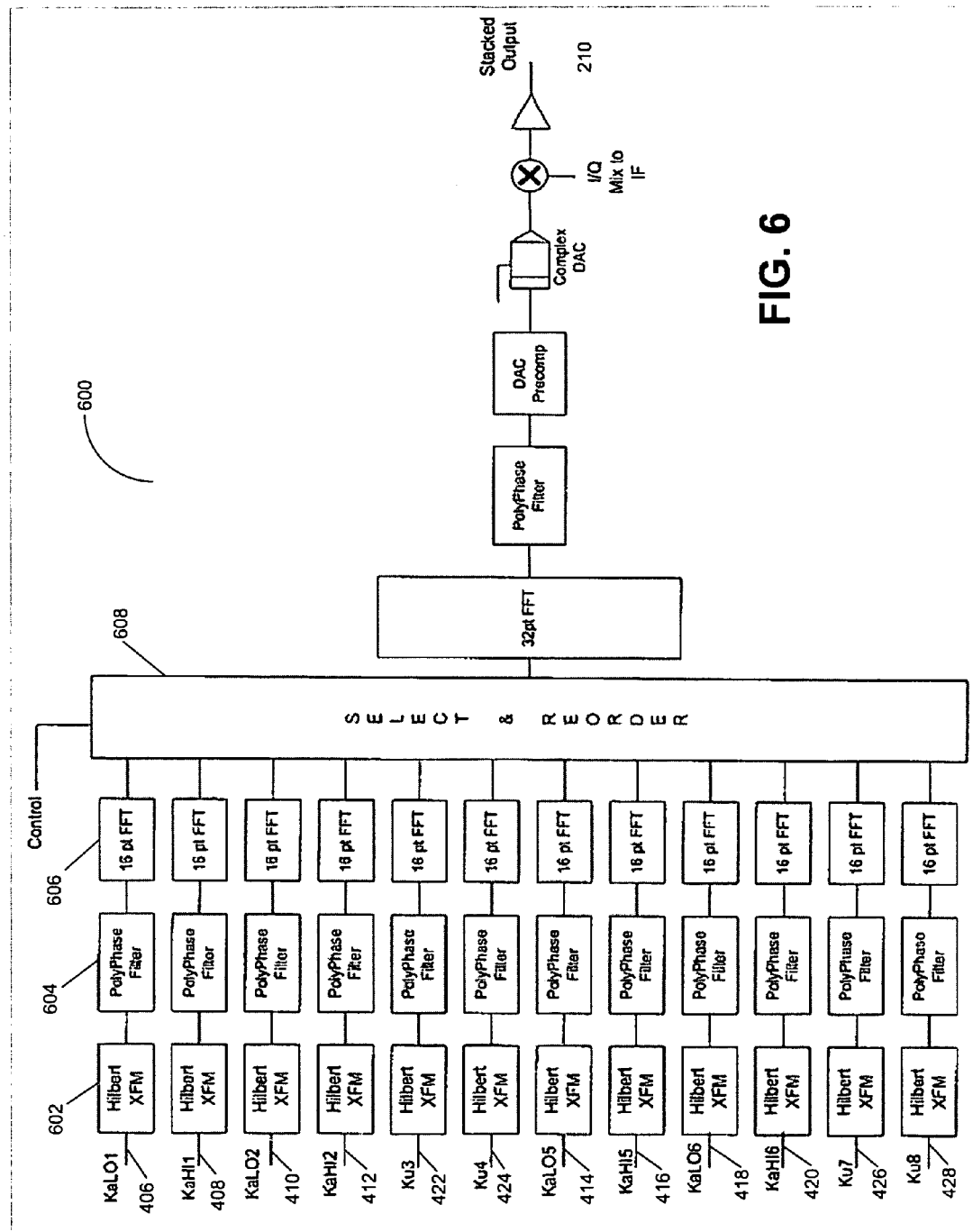
FIG. 6 illustrates a coarse granularity channelizer in accordance with one or more embodiments of the present invention.

FIG. 6 illustrates a coarse granularity channelizer in accordance with one or more embodiments of the present invention.

In FIG. 6, system 600 shows inputs 406-428, each entering a Hilbert transform 600. Hilbert transforms 602 are linear operations, typically multipliers, similar to Fourier transforms. Other types of transforms of the signal inputs 406-428 are also possible within the scope of the present invention. The K filters 604 for each of the inputs 406-428 are set to 16, but other settings are possible within the scope of the present invention, including different values for K and x for each input 406-428. If the transponder count and spacing are uniform and well known, then K can be set to the number of transponders, etc. If, however, the number of transponders varies from satellite to satellite and/or the spacing of these transponders is not uniform, then a number of filters 604 greater than the maximum number of transponders to be encountered is typically used to allow for expansion. Further, the filters are then expanded or contracted by slight adjustments in the sampling frequency and by slight shifts in the downconverter LO frequency used in the LNB. By adjustment of both the downconverter LO of the LNB and sampling rate, any channel spacings can be accommodated in any of the LNB outputs.

The signals 406-428, after being filtered by filters 602 are subjected to Fast Fourier Transforms (FFT) in FFTs 606, and then selected, reordered, and combined in multiplexer 608. The combined signal is further processed to generate stacked output 210. Alternatively, the present invention can use a non-maximally decimated filter bank of overlapping filters. This approach, along with the added technique of near-perfect reconstruction techniques, allow for fine granularity.

A choice of L=32 is typically chosen for the output despite a maximum of 26 channels. The choice of the power of 2 composite K and L is chosen to simplify the FFT hardware implementation. Other approaches or arrangements may also be used within the scope of the present invention.

ADC ENOB Considerations

Consider any one of the 500 MHz LNB signals 406-428. Since each signal is a composite of many signals, each signal is approximately Gaussian distributed. Given this approximation, the attack point on the ADC can be set so that the full scale deflection is 3.3 times the Root Mean Square (RMS) value of the composite signal. This corresponds to setting the probability at a 3.3 sigma event. This will result in a probability of overflow of $10^{-3}$. Under these conditions, the Signal to Quantization noise Ratio (SQR) is (6.02b+0.42) dB where b=ENOB-1. For and A/D with and ENOB of 9 bits this results in an SQU of the composite signal of 45.58 dB.

The SQR of a single transponder, in a twelve transponders mix with five high-power transponders and seven low power transponders, where a high power transponder is 10 dB higher than a low power transponder. A given low power transponder then accounts for $1/57^{th}$ of the composite power, or −17.56 dB from the composite power. The transponder's Noise Equivalent Bandwidth at the receiver is 36 MHz. Quantization noise is essentially white noise over the Nyquist bandwidth. If the Nyquist bandwidth is set to 500 MHz for the composite bandwidth, then the noise BW affecting the transponder is 36/500, which is −11.43 dB down from the total quantization noise. Therefore the SQR affecting the demodulator is 48.58−17.56+11.43=42.45 dB. Since the 8PSK waveform typically has an Signal to Noise Ratio (SNR) requirement of approximately 11 dB, an ENOB of 9 bits is typically satisfactory in terms of design. However, an accounting of the NPR of the finite word processing and additional details of the noise bandwidth and system settings may allow the ENOB to be relaxed from a 9 bit setting and still be within the scope of the present invention.

Figure 7:
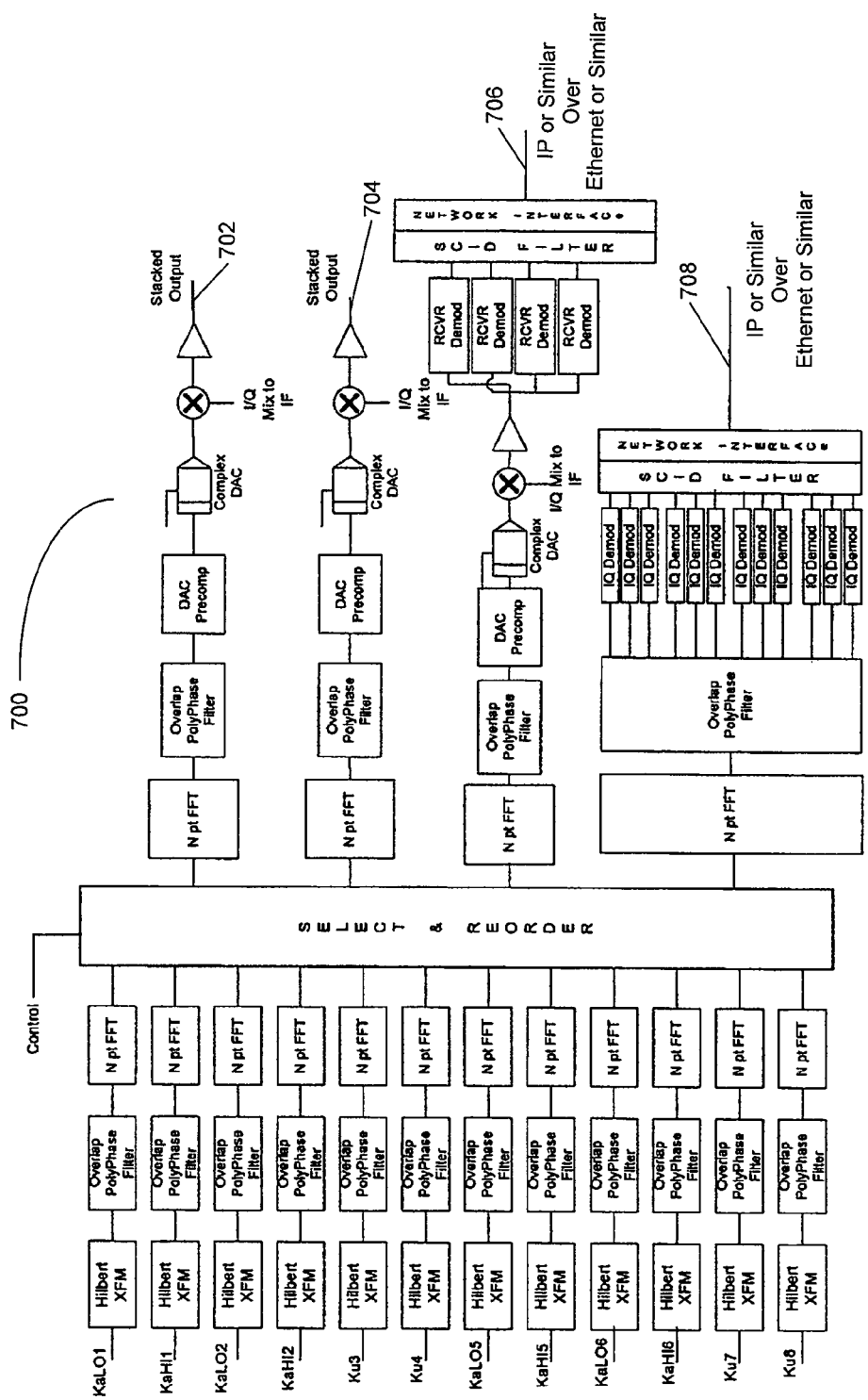
FIG. 7 illustrates an exemplary fine granularity channelizer embodiment in accordance with one or more embodiments of the present invention.

FIG. 7 illustrates a fine granularity channelizer implementation in accordance with one or more embodiments of the present invention.

A fine granularity design using perfect or near perfect reconstruction polyphase filtering techniques has advantages over the coarse granularity approach. Employment of maximal decimation techniques can be used to simplify filter design if desired. For such an approach, the spectrum of each of the incoming 500 MHz blocks is subdivided much more finely than in the coarse granularity design. Where in the coarse granularity design the goal is to create a number of filters greater than or equal to the maximum number of expected transponders, in the fine granularity design the goal is to divide up the spectrum into smaller pieces. This can be done in such a way that the fine pieces of spectrum can be "glued" back together to yield a nearly perfect reconstruction of any arbitrary spectral bandwidth within the granularity specified for the design. An illustrative design for a fine granularity system is shown in FIG. 7.

The system 700 shown in FIG. 7 has four output signals 702, 704, 706, and 708. Outputs 702 and 704 are typically used to create two 500 MHz blocks of single wire bandwidth. Outputs 702 and 704 can then be power combined onto a single wire interface and thus replicate the output of related SWM designs, except that they provide more channels within the same physical bandwidth.

The other outputs 706 and 708 illustrate two illustrative embodiments that include shared demod assets that do not expend any of the Single Wire Bandwidth. Other embodiments are possible within the scope of the present invention. Only one output 708 or 708 can be implemented, or other embodiments can be implemented alone or in any combination, without departing from the scope of the present invention. Output 706 illustrates an approach having an additional internal single wire interface which drives conventional receiver/demod inputs.

Output 708 illustrates an approach where that the receiver portion of the receiver demod chips can be eliminated at the same time as the last upconversion of the processed signals. These chips correspond to I/Q near baseband demodulation. Other configurations are possible if some of the output polyphase filtering is incorporated directly on the demod chip. In both outputs 706 and 708 the output of the shared demod resources is SCID filtered data which is networked onto any suitable physical layer and/or network layer protocols for distribution throughout the house or MDU. The outputs 706 and 708 are Internet Protocol (IP) type outputs, or similar, that can be output over ethernet cabling, local area networks, RF or IR signals, or other similar interfaces as desired, without departing from the scope of the present invention.

CONCLUSION

The present invention discloses embodiments of computationally efficient designs for broadcast satellite single wire and/or direct demod interfaces.

A broadcast satellite single wire interface in accordance with one or more embodiments of the present invention comprises a low noise block amplifier module having multiple outputs, a plurality of filter banks, each filter bank coupled to each of the outputs of the low noise block amplifier module in a respective fashion and comprising a plurality of filters, and a plurality of analog-to-digital (A/D) converters, each A/D converter coupled to a filter in the plurality of filters in the plurality of filter banks in a respective fashion, wherein the A/D converters directly sample incoming downconverted broadcast satellite signals and the sampled incoming downconverted broadcast signals are output on a single wire in a stacked output.

Such an interface may further optionally comprise the sampling frequency of the A/D converters being adjustable; a digital signal processor (DSP), where the DSP may comprise a plurality of polyphase bandpass filters, the plurality of polyphase bandpass filters overlapping in terms of passbands; a plurality of stacked outputs being present, where at least one of the plurality of stacked outputs being an In-phase/Quadrature phase (I/Q) near-baseband output, and the I/Q near-baseband output being networked onto a distribution layer.

A system in accordance with one or more embodiments distributes a plurality of satellite signals on a single interface, and comprises a plurality of low noise block amplifier modules, each receiving at least one satellite signal, a plurality of filter banks, each filter bank coupled to each of the outputs of the low noise block amplifier module in a respective fashion and comprising a plurality of filters, a plurality of analog-to-digital (A/D) converters, each A/D converter coupled to a filter in the plurality of filters in the plurality of filter banks in a respective fashion, wherein the A/D converters directly sample incoming downconverted broadcast satellite signals, a plurality of transformers, each transformer coupled to an A/D converter in the plurality of A/D converters in a respective fashion, and a combiner, coupled to the plurality of transformers, wherein the combiner outputs the plurality of satellite signals on the single interface.

Such a system may further optionally comprise the sampling frequency of the A/D converters being adjustable; a digital signal processor (DSP), where the DSP may comprise a plurality of polyphase bandpass filters, the plurality of polyphase bandpass filters overlapping in terms of passbands; a plurality of stacked outputs being present, where at least one of the plurality of stacked outputs being an In-phase/Quadrature phase (I/Q) near-baseband output, and the I/Q near-baseband output being networked onto a distribution layer.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but by the claims appended hereto and the full range of equivalents of the claims appended hereto.

What is claimed is:

1. A broadcast satellite single wire interface, comprising:
   a low noise block amplifier module having multiple outputs;
   a plurality of filter banks, each filter bank coupled to each of the outputs of the low noise block amplifier module in a respective fashion and comprising a plurality of filters;
   a plurality of analog-to-digital (A/D) converters, each A/D converter coupled to a filter in the plurality of filters in the plurality of filter banks in a respective fashion;
   a plurality of Hilbert transformers and a plurality of Fourier transformers, each Hilbert transformer coupled in series with a corresponding Fourier transformer and in series with a corresponding A/D converter in the plurality of A/D converters; and
   a combiner, coupled to outputs of the plurality of Fourier transformers, for combining signals output from the Fourier transformers in a digital manner, wherein the A/D converters directly sample incoming downconverted broadcast satellite signals and the sampled incoming downconverted broadcast signals are output on a single wire from the combiner in a stacked output.

2. The broadcast satellite single wire interface of claim 1, wherein the sampling frequency of the A/D converters is adjustable.

3. The broadcast satellite single wire interface of claim 1, further comprising a digital signal processor (DSP).

4. The broadcast satellite single wire interface of claim 3, wherein the DSP comprises a plurality of polyphase bandpass filters.

5. The broadcast satellite single wire interface of claim 4, wherein the plurality of polyphase bandpass filters overlap in terms of passbands.

6. The broadcast satellite single wire interface of claim 5, wherein a plurality of stacked outputs are present.

7. The broadcast satellite single wire interface of claim 6, wherein at least one of the plurality of stacked outputs is an In-phase/Quadrature phase (I/Q) near-baseband output.

8. The broadcast satellite single wire interface of claim 7, wherein the I/Q near-baseband output is networked onto a distribution layer.

9. A system for distributing a plurality of satellite signals on a single interface, comprising:
   a plurality of low noise block amplifier modules, each receiving at least one satellite signal;
   a plurality of filter banks, each filter bank coupled to each of the outputs of the low noise block amplifier module in a respective fashion and comprising a plurality of filters;
   a plurality of analog-to-digital (A/D) converters, each A/D converter coupled to a filter in the plurality of filters in the plurality of filter banks in a respective fashion, wherein the A/D converters directly sample incoming downconverted broadcast satellite signals;
   a plurality of transformers, each transformer in the plurality of transformers comprising at least a Fourier transformer and a Hilbert transformer, each transformer coupled to an A/D converter in the plurality of A/D converters in a respective fashion; and
   a combiner, coupled to the plurality of transformers, wherein the combiner combines outputs from the transformers in a digital manner and outputs the plurality of satellite signals on the single interface.

10. The system of claim 9, wherein the sampling frequency of the A/D converters is adjustable.

11. The system of claim 9, further comprising a digital signal processor (DSP).

12. The system of claim 11, wherein the DSP comprises a plurality of polyphase bandpass filters.

13. The system of claim 12, wherein the plurality of polyphase bandpass filters overlap in terms of passbands.

14. The system of claim 13, wherein a plurality of stacked outputs are present.

15. The system of claim 14, wherein at least one of the plurality of stacked outputs is an In-phase/Quadrature phase (I/Q near-baseband output.

16. The system of claim 15, wherein the I/Q near-baseband output is networked onto a distribution layer.

* * * * *